(12) United States Patent  
Jung et al.

(10) Patent No.: US 9,286,895 B2
(45) Date of Patent: Mar. 15, 2016

(54) METHOD AND APPARATUS FOR PROCESSING MULTIPLE INPUTS

(71) Applicant: Samsung Electronics Co., Ltd., Gyeonggi-do (KR)

(72) Inventors: Howon Jung, Gyeonggi-do (KR); Woomok Kim, Gyeonggi-do (KR); Taehyung Kim, Gyeonggi-do (KR); Yoonjung Choi, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 176 days.

(21) Appl. No.: 13/895,729

(22) Filed: May 16, 2013

(65) Prior Publication Data

US 2014/0006033 A1    Jan. 2, 2014

(30) Foreign Application Priority Data

Jun. 29, 2012 (KR) .......................... 10-2012-0071229

(51) Int. Cl.
| | | |
|---|---|---|
| G10L 21/00 | (2013.01) | |
| G10L 15/26 | (2006.01) | |
| G10L 15/22 | (2006.01) | |
| G06F 3/01 | (2006.01) | |
| G06F 3/041 | (2006.01) | |
| G06F 3/038 | (2013.01) | |
| G06F 3/0488 | (2013.01) | |

(52) U.S. Cl.
CPC . *G10L 15/22* (2013.01); *G06F 3/01* (2013.01); *G06F 3/038* (2013.01); *G06F 3/041* (2013.01); *G06F 3/04886* (2013.01); *G06F 2203/0381* (2013.01)

(58) Field of Classification Search
None
See application file for complete search history.

(56) References Cited

U.S. PATENT DOCUMENTS

| 5,600,765 | A | * | 2/1997 | Ando et al. .................. 345/668 |
| 6,073,036 | A | * | 6/2000 | Heikkinen et al. ......... 455/550.1 |
| 8,116,824 | B2 | * | 2/2012 | Choi ............................. 455/566 |
| 8,701,049 | B2 | * | 4/2014 | Kim .............................. 715/863 |
| 2009/0174677 | A1 | | 7/2009 | Gehani et al. |
| 2010/0210332 | A1 | | 8/2010 | Imai |
| 2011/0022393 | A1 | * | 1/2011 | Waller et al. ................. 704/270 |
| 2011/0119216 | A1 | * | 5/2011 | Wigdor ........................... 706/46 |
| 2011/0167339 | A1 | | 7/2011 | Lemay |
| 2011/0248939 | A1 | | 10/2011 | Woo et al. |
| 2011/0310005 | A1 | * | 12/2011 | Chen et al. .................... 345/156 |
| 2012/0011437 | A1 | | 1/2012 | James et al. |

(Continued)

FOREIGN PATENT DOCUMENTS

| EP | 2 348 392 | 7/2011 |
| JP | 07064694 | 3/1995 |

(Continued)

OTHER PUBLICATIONS

Australian Examination Report dated Oct. 19, 2015 issued in counterpart application No. 2013204564, 3 pages.

*Primary Examiner* — Satwant Singh
(74) *Attorney, Agent, or Firm* — The Farrell Law Firm, P.C.

(57) ABSTRACT

A method of processing multiple inputs in an apparatus having interfaces for interaction with an outside is provided. The method includes detecting a first user input from one of the interfaces, performing a function in response to the first user input, detecting a second user input or a system input from another one of the interfaces, and changing attributes of the function in response to the second user input or the system input.

20 Claims, 8 Drawing Sheets

(56) References Cited

U.S. PATENT DOCUMENTS

| | | | |
|---|---|---|---|
| 2012/0029921 A1 | 2/2012 | Grant et al. | |
| 2012/0060109 A1* | 3/2012 | Han et al. | 715/769 |
| 2012/0188164 A1* | 7/2012 | Dey et al. | 345/163 |
| 2013/0019204 A1* | 1/2013 | Kotler | G06F 3/04812 715/833 |
| 2014/0189515 A1* | 7/2014 | Waldman | G06F 3/01 715/719 |
| 2014/0272843 A1* | 9/2014 | Foster et al. | 434/236 |
| 2015/0006172 A1* | 1/2015 | Alameh | 704/235 |
| 2015/0058462 A1* | 2/2015 | Tafel | 709/223 |

FOREIGN PATENT DOCUMENTS

| | | |
|---|---|---|
| KR | 20110074145 | 6/2011 |
| KR | 1020110112980 | 10/2011 |
| WO | WO 2011/045805 | 4/2011 |

* cited by examiner

METHOD AND APPARATUS FOR PROCESSING MULTIPLE INPUTS

PRIORITY

This application claims priority under 35 U.S.C. §119(a) to a Korean Patent Application filed in the Korean Intellectual Property Office on Jun. 29, 2012 and assigned Serial No. 10-2012-0071229, the entire disclosure of which is incorporated herein by reference.

BACKGROUND OF THE INVENTION

1. Field of the Invention

The present invention generally relates to a method and apparatus for processing multiple inputs, and more particularly, to a method and apparatus for performing a function in response to simultaneously occurring multiple inputs.

2. Description of the Related Art

Portable terminals are typically used for wireless voice calls and information exchange. With the development of newer technologies, portable terminals now provide various services and functions. For example, portable terminals have been developed as multimedia devices capable of providing various services such as a phone book, game, short message, e-mail, morning call, music player, schedule management, digital camera and wireless Internet.

Further, voice recognition technology is being rapidly developed, which not only converts a voice into a text and recognizes words, but also recognizes a context like a human voice. Such a voice recognition technology is being applied to various terminals such as a smart phone, a smart TV, a tablet PC, etc. Terminals may perform various functions (e.g., taking a photograph, Internet connection, music play, navigation service, etc.) in response to input information, particularly voice information.

Today, portable terminals provide various input devices, such as a touch screen and a microphone as an interface for an input of interaction with a user. That is, the user may control the portable terminal by a touch input through a touch screen. Further, the user may control a portable terminal by a voice input through a microphone. That is, the conventional portable terminal individually processes the user's inputs. In particular, the conventional portable terminal separately processes an input other than a voice input. Hence, it may be inefficient to have various kinds of input devices in a portable terminal.

SUMMARY OF THE INVENTION

The present invention has been made to address at least the above problems and disadvantages, and to provide at least the advantages described below. Accordingly, an aspect of the present invention is to provide a method and apparatus for providing an environment in which two or more input methods may be used in combination. In other words, a method and apparatus for processing multiple inputs that are simultaneously input from different input interfaces are provided.

Another aspect of the present invention is to provide a method and apparatus capable of recognizing a user's intention from voice information input from a microphone and accurately reflecting the user's intention on functions performed by an interface other than the microphone.

In accordance with an aspect of the present invention, a method of processing multiple inputs in an apparatus having interfaces for interaction with an outside environment includes detecting a first user input from one of the interfaces; performing a function in response to the first user input; detecting a second user input or a system input from another one of the interfaces; and changing attributes of the function in response to the second user input or the system input.

In accordance with another aspect of the present invention, an apparatus for processing multiple inputs includes interfaces for interaction with an outside environment; and a controller for controlling the interfaces, wherein the controller detects a first user input from one of the interfaces, performs a function in response to the first user input, detects a second user input or a system input from another one of the interfaces, and changes attributes of the function in response to the second user input or the system input.

BRIEF DESCRIPTION OF THE DRAWINGS

The aspects, features and advantages of the present invention will be more apparent from the following detailed description in conjunction with the accompanying drawings, in which.

DETAILED DESCRIPTION OF EMBODIMENTS OF THE PRESENT INVENTION

Figure 1:
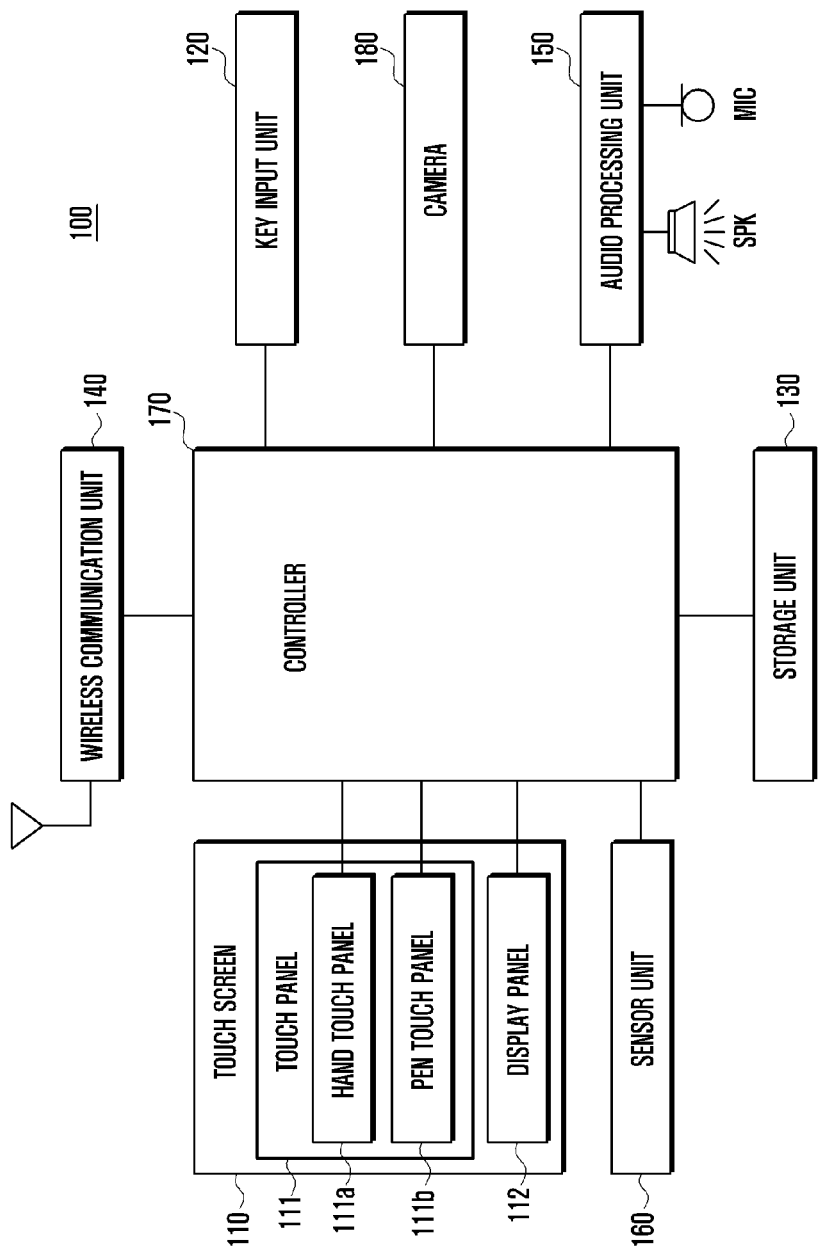
FIG. 1 is a block diagram illustrating an apparatus for processing multiple inputs according to an embodiment of the present invention.

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

A method and apparatus for processing multiple inputs according to the present invention may be applied to multimedia devices such as a smart phone, a tablet PC, a notebook PC, a desktop PC, a TV, a navigation system and a video phone. Further, the method and apparatus may also be applied to devices combined with multimedia devices (e.g., a refrigerator having a communication function and a touch screen).

In the present invention, "input" is information input from various interfaces for interaction with an outside environment, and may include a user input and a system input. Specifically, "user input" is the user's input information input to a device through one of user interfaces (e.g., a touch screen, a microphone, a sensor unit, a key input unit, etc.), and includes the user's gesture for a touch screen using a handling means (e.g., a user's hand or pen), voice information input through a microphone, motion information sensed in the sensor unit, etc. Here, motion information includes the user's motion information. The user motion information may be a hand motion, a face motion or an eye motion photographed by a camera (an image sensor). Further, if the apparatus is a portable terminal, the motion information may include motion information of the device. The device motion information may include the device's acceleration information sensed in an acceleration sensor according to the user's shaking of a portable terminal.

In the present invention, the system input is information related to the external environment of the device. Here, the external environment may broadly include a natural environment and a communication environment. For example, the information related with the natural environment may include external illumination, temperature, humidity, speed, position and moving direction of the portable terminal, etc. Further, the information related with the communication environment may include wireless communication network information connected with the terminal, such as LTE, 3G, Wi-Fi and Bluetooth, and attributes information of an external device connected by wired line.

In the present invention, an input may be divided into a user input and a system input according to whether the input is generated by the user, from the perspective of the user. From the perspective of a device, an input may be divided into a user input and a system input based on a generated place of the input. For example, an input generated in the touch screen may be a user input and an input generated in the illumination sensor may be a system input.

The method and apparatus according to the present invention may process simultaneously generated multiple inputs. In particular, the method and apparatus according to the present invention may change the attributes of the function performed by a first user input in response to a second user input or a system input. For example, the method and apparatus displays handwriting on the screen in response to a pen touch. At this time, if a user's voice "red" is detected, the method and apparatus according to the present invention changes the color of the handwriting to the color red. Further, the method and apparatus according to the present invention may correct the color of the handwriting to red.

FIG. 1 is a block diagram illustrating an apparatus 100 for processing multiple inputs according to an embodiment of the present invention.

Referring to FIG. 1, the apparatus 100 includes a touch screen 110, a key input unit 120, a storage unit 130, a wireless communication unit 140, an audio processing unit 150, a speaker (SPK), a microphone (MIC), a sensor unit 160 and a controller 170, and may also include a camera 180.

The touch screen 110 includes a touch panel 111 and a display panel 112 to provide a user interface for interaction with the user. The touch panel 111 may be placed on the display panel 112. Specifically, the touch panel 111 may be implemented as an add-on type placed on the display panel 112, an on-cell type, or in-cell type inserted into the display panel 112.

The touch panel 111 generates an analog signal (e.g., a touch event) in response to the user's gesture on the touch panel 111, and A/D-converts (analog to digital convert) the analog signal and transmits the converted signal to the controller 170. The controller 170 detects the user's gesture from the transmitted touch event. That is, the controller 170 controls the components by detecting the touched point, the moving distance of the touch, the moving direction of the touch, the speed of the touch and the pressure of the touch, etc.

The touch panel 111 may be an integrated touch panel including a hand touch panel 111a that senses a hand gesture and a pen touch panel 111b that senses a pen gesture. Here, the hand touch panel 111b may be a capacitive type, generates a touch event not only by the user's hand gesture, but may generate a touch event also by another object (e.g., an object made of a conductive material that may change a capacitance). That is, a touch event may be generated not only by the user's hand, but also by other objects, in the hand touch panel 111a. The hand touch panel 111a is not limited to a capacitive type, but may be a resistive type, an infrared type, or an ultrasonic type. The pen touch panel 111b may be an electromagnetic induction type. As such, the pen touch panel 111b generates a touch event by a specially manufactured stylus pen for a touch to form a magnetic field.

The user gesture for the touch screen 110 is broadly divided into a hand gesture and a pen gesture according to a touch input means as described above. As described above, the hand gesture is sensed in the hand touch panel 111a, and the pen gesture is sensed in the pen touch panel 111b.

The user's gesture is divided into a touch and a touch gesture regardless of a handling means. Further, the touch gesture may include a tap, a double tap, a long tap, a drag, a drag & drop, a flick, a press, etc. Here, the touch is an operation of contacting one point of the screen using a touch input means (e.g., a finger or a stylus pen), the tap is an operation of touching one point with a touch input means and then removing the touch of the touch input means from the point without moving the touch input means, the double tab is an operation of consecutively performing the tap operation twice at one point, the long tap is an operation of touching one point for a relatively long time and then removing the touch of the touch input means at the point without moving the touch input means, the drag is an operation of moving the touch input means in a predetermined direction in a state where a certain point has been touched, the drag & drop is an operation of dragging and then removing the touch input means, and the flick is an operation of quickly moving the input means compared to the drag, and then removing the touch. The press is an operation of touching one point with the touch input means and pushing the point. That is, a "touch" is a state in which the contact with the touch screen is maintained, and a "touch gesture" is a movement of a touch from the touch (touch-on) to the removal (touch-off) of the touch. The touch panel may sense a pressure at the touched point by including a pressure sensor. The sensed input information is transmitted to the controller 170, and the controller 170 distinguishes a touch from a press based on the sensed pressure information.

The display panel 112 converts image data input from the controller 170 into analog signals, and displays the signals under the control of the controller 170. That is, the display panel 112 displays various screens according to the use of the apparatus 100, such as a lock screen, a home screen, an application (App) screen and a keypad screen. The lock screen may be defined as an image displayed on the display panel 112 when the display panel 112 is turned on. If a touch gesture for releasing the lock is detected, the controller 170 changes the displayed image to a home screen or an application execution screen, etc. The home screen may be defined as an image including a plurality of application icons corresponding to a plurality of applications.

If one of a plurality of applications is selected by a user (e.g., an icon is tapped), the controller 170 executes a corresponding application (e.g., Internet, document writing, chatting, text transmission, etc.), and displays the execution screen on the display panel 112. The display panel 112 may display one of the screens as the background and may overlap another screen as the foreground with the background. For example, the display panel 112 may display an application execution screen and may display a keypad on the application execution screen.

Further, the display panel 112 may display a plurality of screens under the control of the controller 170. For example, the display panel 112 may display a keypad on the first screen area of the touch screen 110, and may display a message input through the keypad on the second screen area of the touch screen 110.

The display panel 112 may be formed of a Liquid Crystal Display (LCD), an Organic Light Emitted Diode (OLED) or an Active Matrix Organic Light Emitted Diode (AMOLED).

The key input unit 120 includes a plurality of keys for receiving number or letter information and setting various functions. Such keys may include a direction key, a side key and a shortcut key, etc. The key input unit 120 generates a key event related with the user setting and the function control of the apparatus, and transmits the generated key event to the controller 170.

The key event may include a power on/off event, a volume adjustment event, and a screen on/off event. The controller 170 controls the above components in response to the key event. Further, the key input unit 120 may include a QWERTY keypad, a 3*4 keypad, 4*3 keypad, etc. including a plurality of keys. If the touch panel is supported as a full touch screen type, the key input unit 120 may include one or more side keys for the screen on/off, the apparatus on/off or volume adjustment. Further, the key of the key input unit 120 may be referred to as a hard key, and the key displayed on the touch screen 110 may be referred to as a soft key.

The storage unit 130 may store data generated in the apparatus (e.g., a text message, a photographed image) or externally received through the wireless communication unit 140 (e.g., a text message, an e-mail) under the control of the controller 170. The storage unit 130 may store the lock screen, the home screen, the keypad, etc. The storage unit 130 may store various setting values (e.g., screen brightness, whether there is a vibration at the time of a touch occurrence, whether the screen is automatically rotated, a background image, etc.) for operation of the apparatus.

The storage unit 130 may include an operating system for booting operation of the apparatus 100, a communication program, an image processing program, a display control program, a user interface program, a user recognition program, an artificial intelligence program, an embedded application, and a third part application, etc.

The communication program includes commands that allow communication with an external device through the wireless communication unit 140. The graphic processing program includes various software components (e.g., modules for converting the image format, adjusting the size of the graphic to be displayed, rendering, and determining the luminance of the backlight unit, etc.) for processing graphic images to be displayed on the touch screen. Here, the graphic image may include a text, a web page, an icon, a picture, a video and an animation, etc. Further, the graphic processing program may include software CODEC 223. The user interface program includes various software components related with the user interface.

For example, the user recognition program may include a voice recognition program and a face recognition program. The voice recognition program detects voice characteristic information (e.g., a tone color, frequency, decibel, etc.) from voice data. The voice recognition program compares the detected voice characteristic information with pre-stored one or more voice characteristic information sets, and recognizes who the user is based on the comparison result. Further, the voice recognition program may include a speech-to-text (STT) function for converting voice data into a text. The face recognition program recognizes the user's face from the image photographed by the camera 180. Specifically, the face recognition program extracts face information from the image data, compares the extracted face information with one or more sets of face information, and recognizes who the user is based on the comparison result. Further, the user recognition may be performed through various programs (e.g., iris scanning, vein recognition, finger scanning, etc.) in addition to the voice recognition program and the face recognition program.

The artificial intelligence program is a program for recognizing the user's intention from voice or image data. For example, the artificial intelligence program may include a natural language processing engine for recognizing and processing a context from voice data, a gesture user motion recognition engine for recognizing intention of a user's gesture motion from image data, an inference engine for inferring intention of the user based on the recognized context, and a conversation engine for conversing with the user based on the recognized context or the user motion.

The term "embedded application" means an application basically installed in the apparatus 100. For example, the embedded application may be a browser, an e-mail, an instant messenger, etc. As already known, the term "third part application" means an application that may be downloaded from an online market and installed in the apparatus 100, and there are various kinds of third party applications. Such a third party application may be freely installed and deleted.

The wireless communication unit 140 performs a voice call, a video call or data communication under the control of the controller 1700. To this end, the wireless communication unit 140 may include a wireless frequency transmission unit for up-converting and amplifying the frequency of the transmitted signal, and a wireless frequency reception unit for low-noise-amplifying and down-converting the frequency of the received signal. Further, the wireless communication unit 140 may include a mobile communication module (e.g., a 3rd-generation mobile communication module, a 3.5-generation mobile communication module or a 4th-generation mobile communication module), a digital broadcast module (e.g., a DMB module), and a local communication module (e.g, a Wi-Fi module, and a Bluetooth module).

The audio processing unit 150 is combined with the speaker (SPK) and the microphone (MIC), and performs voice recognition, voice replication, digital recording and an input and output of audio signals for a phone function. That is, the audio processing unit 150 outputs an audio signal through the speaker (SPK), and performs a function for receiving an input of an audio signal through the microphone (MIC). The audio processing unit 150 receives audio data from the controller 170, converts the received audio data into analog signals (D/A conversion), and outputs the analog signals through the speaker (SPK). The audio processing unit 150 receives analog signals from the microphone (MIC), converts the received analog signals into audio data (A/D conversion), and provides the audio data to the controller 170. The speaker (SPK) converts analog signals received from the audio processing unit 150 into sound waves and outputs the sound waves. The microphone (MIC) converts sound waves transmitted from a human or other sound source into analog signals.

The sensor unit 160 detects state changes such as a tilt change, illumination change, acceleration change, and transmits the detected change to the controller 170. The sensor unit 160 may be composed of various sensors, and the sensors detects the state changes of the apparatus 100 along with the power supply under the control of the controller 170. The sensor unit 160 may be implemented by integration of sensors on one chip or separate chips of sensors. Specifically, the sensor unit 160 may include an acceleration sensor. The acceleration sensor measures the acceleration for each of x-axis, y-axis and z-axis elements. The acceleration sensor may include a gyro sensor, and if there is no movement in the apparatus, gravity acceleration may be measured.

For example, if the touch screen 110 is placed on the xy-plane toward the upper side (e.g., a positive z-axis direction), the x-axis and y-axis element of the gravity acceleration detected by the sensor unit 160 may be 0 m/sec2, and the z-axis element may be +9.8 m/sec2. If the touch screen 110 is turned over, the x-axis and y-axis element may be 0 m/sec2, and the z-axis element may be −9.8 m/sec2. If there is a movement in the apparatus 100, the acceleration sensor detects acceleration which is the sum of the kinetic acceleration and gravity acceleration of the apparatus 100.

The controller 170 controls overall operation of the apparatus 100 and the signal flow between internal components of the apparatus 100, and processes data. Further, controller 170 controls a power supply to internal components in the battery.

The controller 170 may include a Central Processing Unit (CPU) and a Graphic Processing Unit (GPU). As is well known, the CPU is a core control unit of a computer system for performing data calculation and comparison, and analysis and execution of commands, etc. The GPU is a graphic control unit for performing calculation and comparison of graphic-related data, and analysis and execution of commands. The CPU and the GPU may be integrated into one package of a single integrated circuit formed of two or more independent cores (e.g., a quad-core). Further, the CPU and the GPU may be integrated into one integrated chip (system on chip (SoC)). Further, the CPU and the GPU may be packaged into a multi layer. Further, the configuration including the CPU and the GPU may be referred to as an application processor (AP).

The multi input processing according to the present invention may be performed in at least one of the cores of the CPU. Further, in the multi input processing, the graphic-related function may be performed in the GPU. For example, at least one of the cores of the GPU performs a function of indicating the handwriting in response to a touch gesture. Of course, the multi input processing according to the present invention may be performed in both the GPU and the CPU. The function of the controller 170 according to the present invention will be specifically described below.

The controller 170 includes a voice recognition unit. The voice recognition unit detects voice characteristic information (e.g., tone color, frequency, decibel, etc.) from the voice information input from the microphone (MIC) through the audio processing unit 150, compares the detected voice characteristic information with a pre-stored one or more sets of voice characteristic information, and recognizes who the user is based on the comparison result. Further, the controller 170 may include a face recognition unit. The face recognition unit extracts face information from image data input from the camera 180, compares the extracted face information with a pre-stored one or more sets of face information, and recognizes who the user is based on the comparison result. The controller 170 may grant a control authority to only the recognized user. That is, the controller 170 may respond only when the voice or the face is recognized. Further, the voice recognition unit may convert the characteristic information of the voice from the input voice information into a text, and recognize the user's intention (e.g., a certain key word such as a "thicker" and "red", or the context) from the input voice information. Also, the face recognition unit may recognize the intention of the user's motion from the image data. At least one of the voice recognition unit and the face recognition unit may be included in an external server instead of inside the apparatus 100.

The camera 180 photographs a subject and outputs the photographed subject to the controller 170 under the control of the controller 170. Specifically, the camera 180 includes an image signal processor (ISP) for converting electric signals input from an image sensor into image data (A/D conversion) and outputs the image data to the controller 170. The ISP of the camera 180 may include a display control module for processing image data as a preview image (e.g., adjusting the resolution to fit the screen size of the touch screen) and outputting the preview image to the controller 170, and a coding module for coding the image data (e.g., compressing the data to be an MPEG format) and outputting the coded data to the controller 170. The controller 170 may display the preview image on the touch screen 110. Further, the controller 170 may store the coded video in the storage unit 130.

Further, the apparatus 100 may be modified in various ways according to the convergence trend of digital devices, and thus not all such modifications may be listed here. The apparatus 100 according to the present invention may further include components that have not been mentioned above, such as a GPS module, a vibration motor, a camera, a hardware CODEC, and a wired communication unit for connection with an external device (e.g., a personal computer, etc.) by wired line. Further, some components of the apparatus 100 of the present invention may be eliminated from the above configuration, or may be substituted by other components.

Figure 2:
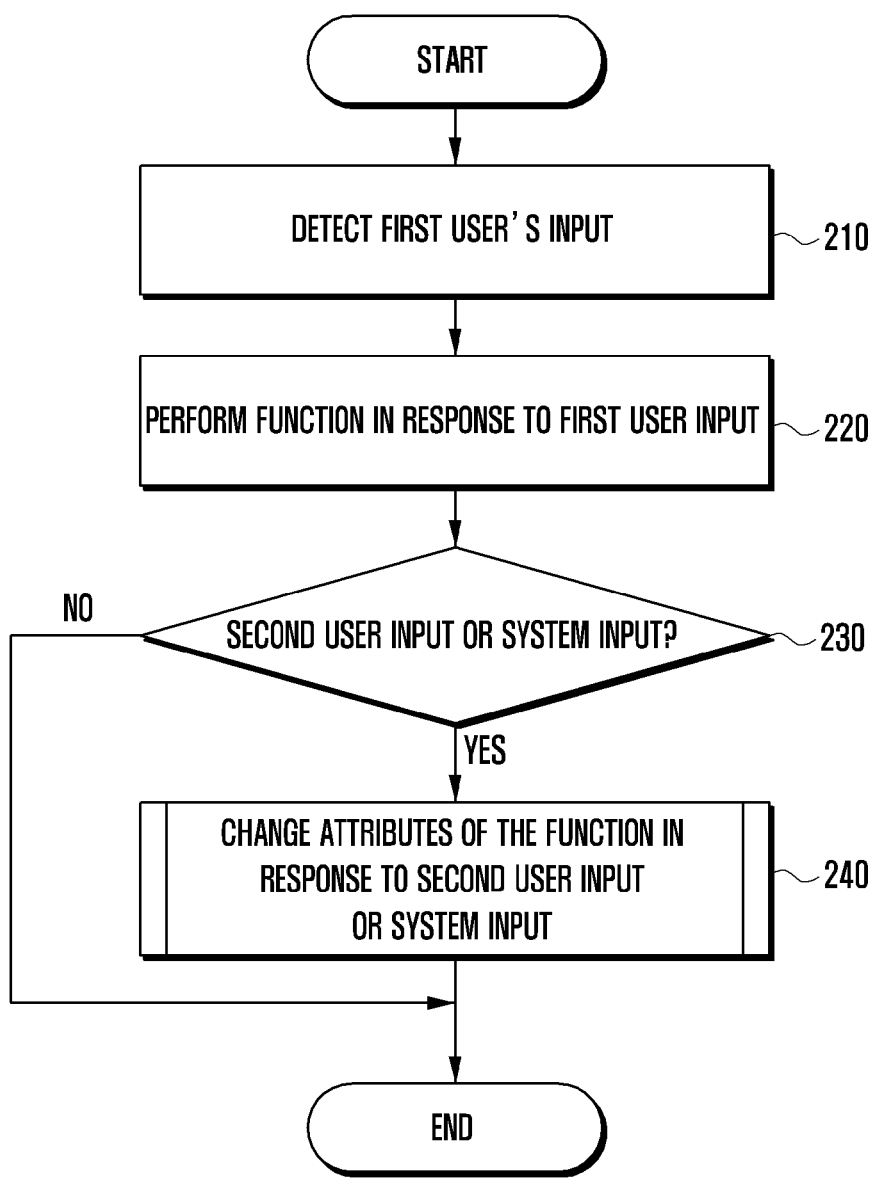
FIG. 2 is a flowchart illustrating a method of processing multiple inputs according to an embodiment of the present invention.
Figure 3:
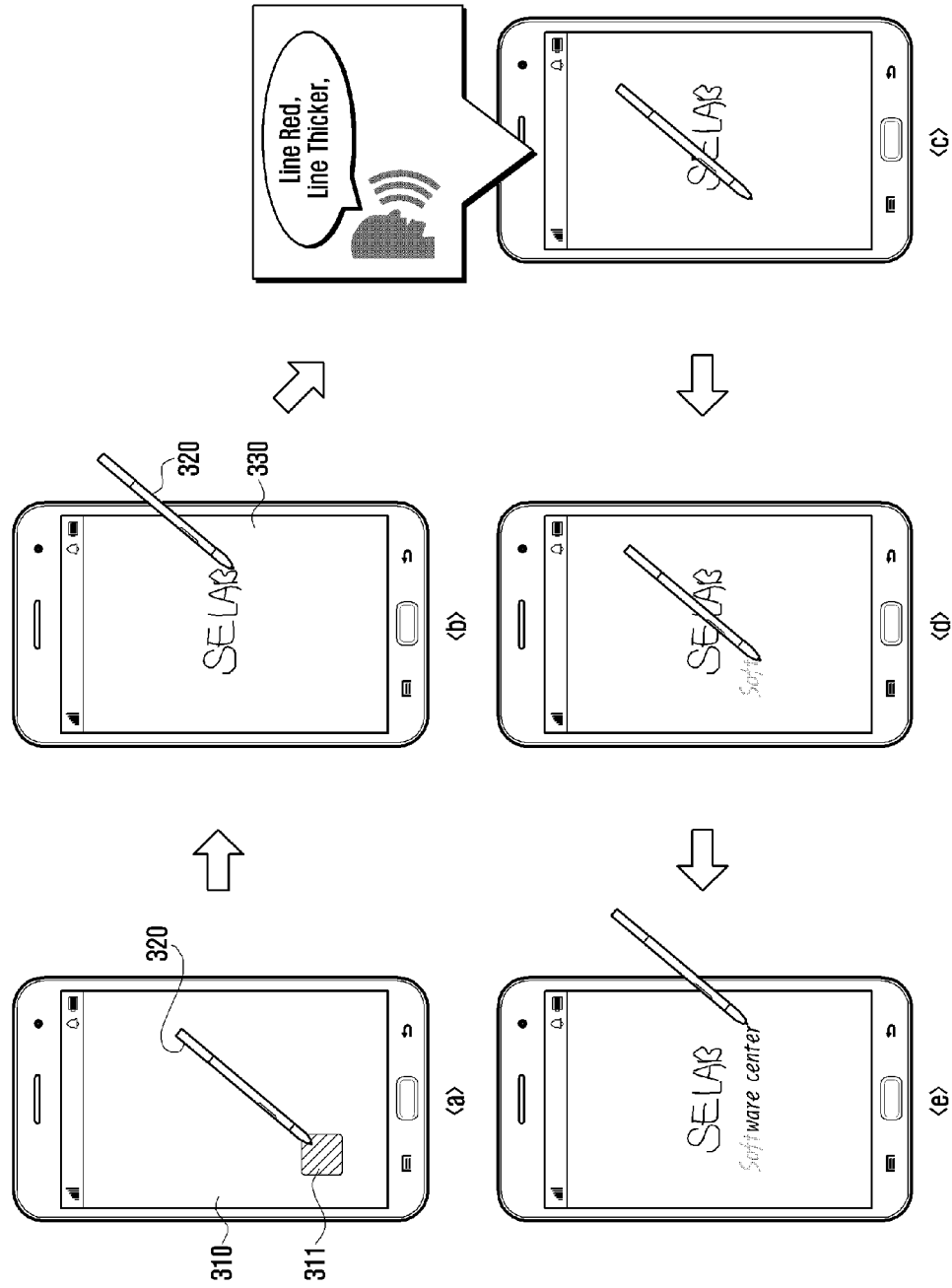
FIGS. 3A-3E are screen examples illustrating a method of processing multiple inputs according to an embodiment of the present invention.

FIGS. 2 and 3 are a flowchart and a screen example, respectively, illustrating a method of processing multiple inputs according to an embodiment of the present invention.

Referring to FIG. 2, the controller 170 detects a first user input from one of user interfaces in step 210. For example, a first user input may be a movement of a handling means on a touch screen in a state where a program for handwriting, drawing or painting using a handling means (e.g., a hand or a pen) is being executed. Specifically, as illustrated in FIG. 3, a touch screen 110 displays a home screen 310. The controller 170 detects selection of a memo writing program (e.g., a double tapping of an icon 311 of a memo writing program using a pen 320) in the home screen 310 (See FIG. 3A). The controller 170 displays the memo writing screen 330 on the touch screen 110 in response to the selection of the memo writing program. The controller 170 detects the first user input on the memo writing screen 330, for example, the movement of the pen 320.

The controller 170 performs a function in response to the first user input in step 220. For example, the function to display "SELAB" corresponding to the movement of the pen 320 is illustrated in FIG. 3B. Here, the function corresponding to the handling means such as the pen 320 is not limited to handwriting, and may be one of functions related with graphic work, such as drawing, painting and erasing. Here, erasing is a function of removing handwriting or a picture made by a writing, drawing, painting, etc.

The controller 170 determines whether a second user input or system input has been detected in step 230. Here, the second user input may have been generated in an interface other than the user interface that has generated the first user input. For example, the first user input is generated in the touch screen 110, and the second user input is generated in one of the microphone (MIC) and the sensor unit 160. Further, the system input may be generated in a place other than the user interface that has generated the first user input. As described above, in the present invention, the system input is information related with the external environment (e.g., the natural environment or communication environment) of the apparatus. As such, the system input may have been generated in the sensor unit 160 or the wireless communication unit 140, etc.

If at least one of the second user input and the system input is detected, the controller 170 changes the attributes of the function performed by the first user input in response to the detected input in step 240. For example, if the function is handwriting, the attribute of the handwriting is changed. For example, referring to FIGS. 3C, 3D and 3E, if the user inputs a voice saying "Line red, Line Thicker", the controller 170 changes the attribute of the handwriting "software center" in response to the voice input. That is, the controller 170 changes the color of the letters to red, and changes the letters to be thick. If a system input, for example, a change of the external illuminance, is detected (e.g., the currently detected external illuminance is greater than 20 Klus (outside)), the controller changes the color of the letters to be bright and changes the background (i.e., the memo writing screen 330) to be relatively dark.

Further, the second user input and the system input for the change of the function may be designated in advance. The designation may be set, for example, by the user in the environment setting screen. Here, the environment setting screen is a screen for setting the use environment of the apparatus 100 such as the sound, brightness, background screen, network, etc. Further, the designation may be set by the manufacturing company, or the change by the user may be impossible. As described above, if the function is a graphic-related work, the second user input is designated as a voice input, and the system input may be designated as a change of the external illuminance.

If the second user input is a voice input, the controller 170 needs time for processing voice information in order to recognize the user's intention. Here, the voice information is input from the audio processing unit 150 through the microphone (MIC), and the processing recognizes the user's intention by analyzing the voice information (e.g., converting the voice information into text, etc.). Such a processing may be performed in the server. That is, the wireless communication unit 140 receives the voice recognition request including the voice information from the controller 170, and transmits the message to the voice recognition server. The voice recognition server processes the voice information, and transmits a response message including the process result (i.e., the user's intention) to the apparatus 100. The function (e.g., handwriting) may be performed in a state where the user's intention is not reflected for voice processing time. For example, referring to FIGS. 3C to 3E, the user gives a voice command "Line red, Line Thicker" as described above with an intention to make the writing thicker and red after writing "SELAB". The user may write "software center" simultaneously along with the voice command. At this time, the "soft" portion of "software" may not reflect the user's intention. That is, the user may give a voice command to change the attributes letters while writing letters. Hence, there may be a portion that needs correction (i.e., a portion that does not reflect the user's intention) that should reflect the user's intention in an already performed function. Step 240 may include such a correction process (FIG. 4 below).

Figure 4:
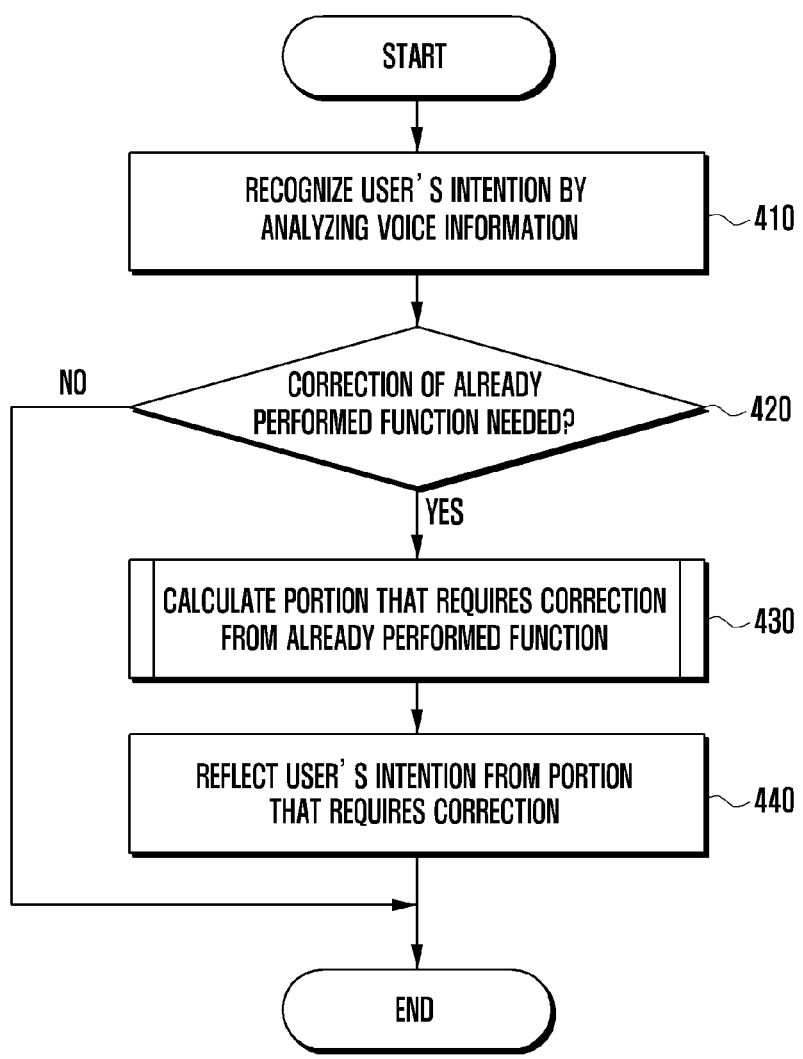
FIG. 4 is a flowchart illustrating a method of changing attributes of a function according to an embodiment of the present invention.
Figure 5:
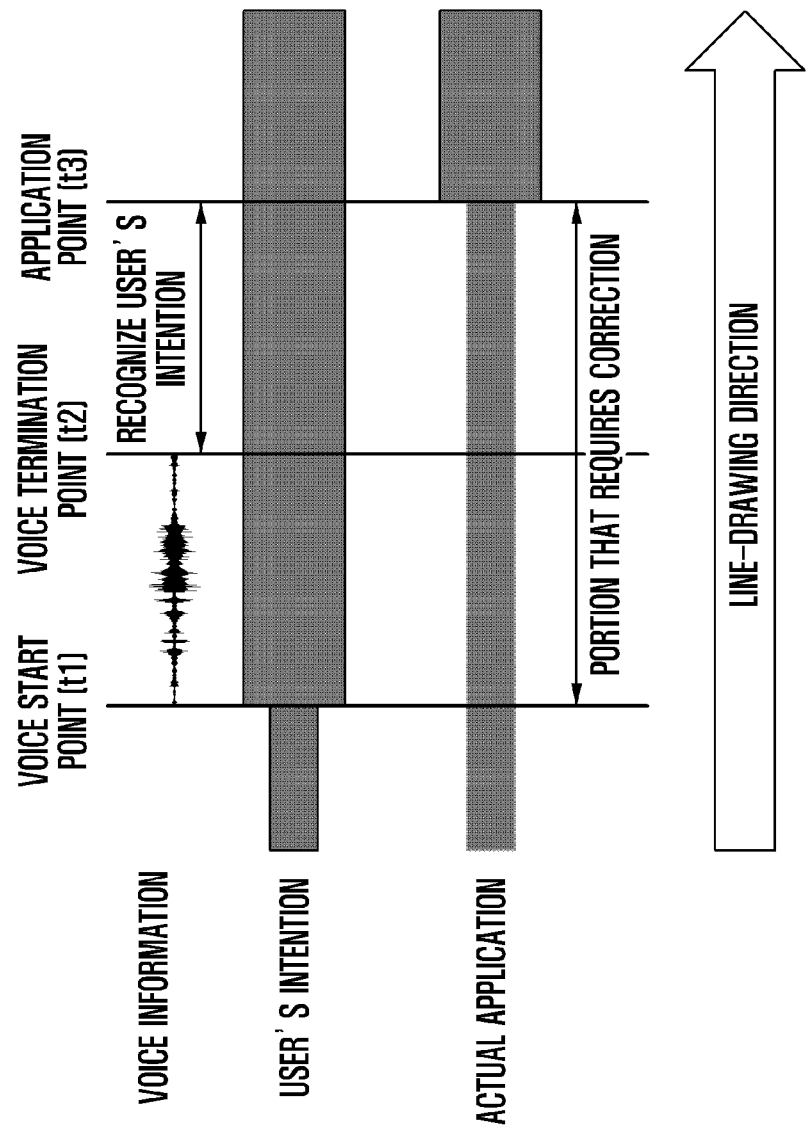
FIG. 5 illustrates a method of calculating a portion that requires correction according to an embodiment of the present invention.

FIG. 4 is a flowchart illustrating a method of changing attributes of the function according to an embodiment of the present invention. FIG. 5 illustrates a method of calculating a portion that requires correction according to an embodiment of the present invention. The description of FIGS. 4 and 5 assumes a situation that gives a voice command to change the attributes of the line while drawing a line on the touch screen 110.

Referring to FIG. 4, the controller 170 analyzes the detected voice information, and recognizes the user's intention in step 410. Specifically, referring to FIG. 5, the controller 170 detects the starting point t1 of the voice. Thereafter, the controller 170 detects the termination point t2 of the voice. The controller 170 recognizes the user's intention by analyzing the voice information of this section t1-t2. Here, the recognition of the user's intention may be processed in the voice recognition server that is an external device, not in the controller 170, as described above. Thereafter, the controller 170 changes the attributes of the line drawing according to the user's intention. For example, the touch screen 110 changes the line to be thick and displays the thickened line under the control of the controller 170. At this time, the point where the user intended to change the line to be thicker is t1, but the time point when the user's intention has actually been applied is t3. That is, according to the user's intention, the line should be thickened from the time point t1 when the user draws the line, but the thickening is applied only from the time point t3 due to the time that takes in the processing. Such a difference may be corrected by the procedure described below.

The controller 170 determines whether the already performed function needs correction in step 420. The controller 170 detects the input of the touch gesture from the touch screen 110, and determines that a correction is needed if an input of the voice information is detected from the microphone (MIC) through the audio processing unit 150. That is, if the first user input (user gesture) and the second user input (voice information) are simultaneously detected (e.g., a situation in which the user draws a line and gives a voice command at the same time), the controller 170 may determine that a correction is needed for a function already performed by the user's input. After generation of a touch event is completed, if voice information is generated (e.g., after the user completes drawing the line and gives a voice command to set the attributes of the function to be performed thereafter), it is possible to determine that correction is not needed for the function performed (i.e., drawing a line).

If correction is needed, the controller 170 produces a portion that needs to be corrected in an already performed function in step 430. For example, referring to FIG. 5, the controller 170 detects time point t1 that is the starting point of the user, and detects t3 that is the time point that is applied after recognizing the user's intention. Further, the controller 170 determines the portion drawn from t1 to t3 from the drawn line as a portion that requires correction.

The controller 170 reflects the user's intention in the portion that requires correction (i.e., thickens the line) in step 440. For example, the controller 170 controls the portion that requires correction to be displayed thicker by the thickness of the thickened line after t3. The controller 170 may control the portion to be displayed gradually thicker toward the line drawing direction. In the case of the color correction, the controller 170 applies the line color applied after t3 to the portion that requires correction. The controller 170 may apply the mixture of the color of the line before t1 and the color of the line after t3 (purple which is the mixture of red and blue) to the portion that requires correction. Hence, the controller 170 may correct the graphic attributes of the portion that requires correction, such as brightness and transparency in addition to thickness and color, based on the recognized user's intention.

Figure 6:
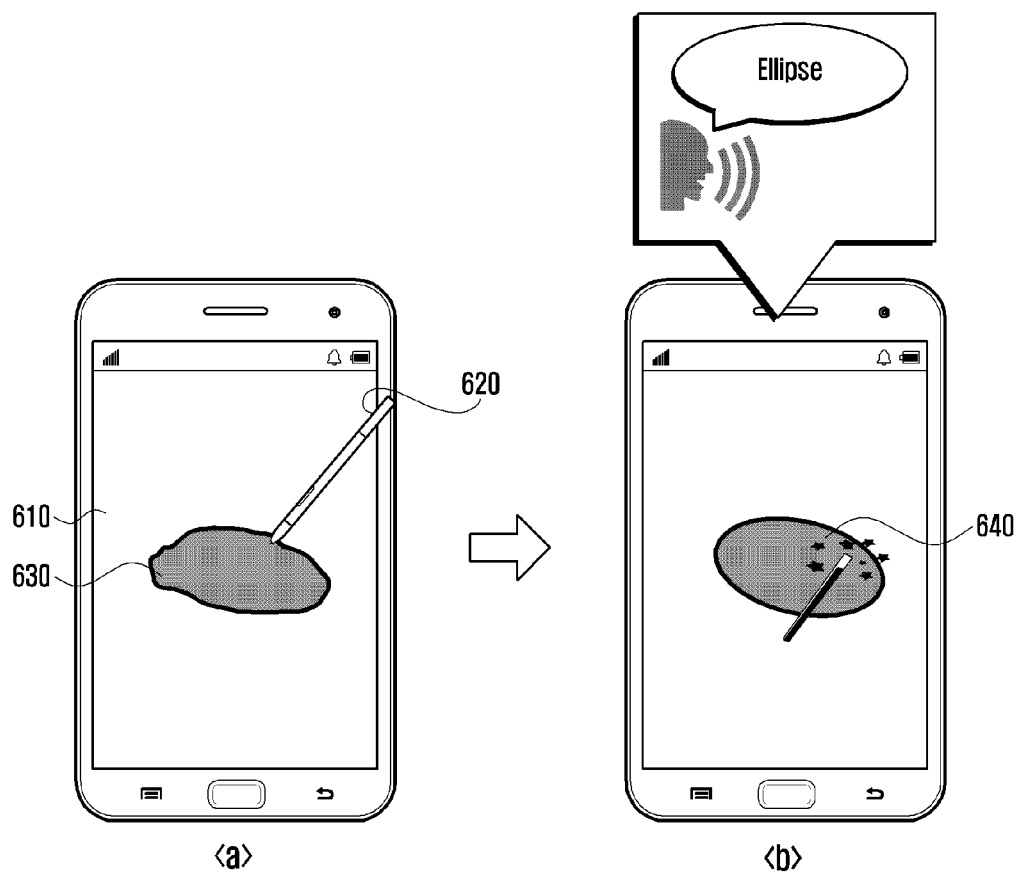
FIGS. 6A-6B are screen examples illustrating a method of processing multiple inputs according to another embodiment of the present invention.

FIG. 6 is a screen example illustrating a method of processing multiple inputs according to another embodiment of the present invention.

Referring to FIG. 6, the controller 170 detects the movement of the pen 620 in the memo writing screen 610. The controller 170 controls the line to be displayed according to the movement of the pen 620. If the displayed line becomes a closed curve 630, the controller 170 controls the color (e.g., blue) to be displayed within the closed curve 630 as illustrated in FIG. 6A. The controller 170 detects an input of voice information from the microphone (MIC) through the audio processing unit 150. The controller 170 analyzes the input voice information, and recognizes the user's intention (e.g., changes the form of the closed curve 630 to be an ellipse shape). The controller 170 controls the closed curve 630 to be changed to an ellipse 640 and be displayed according to the user's intention (see FIG. 6B).

Figure 7:
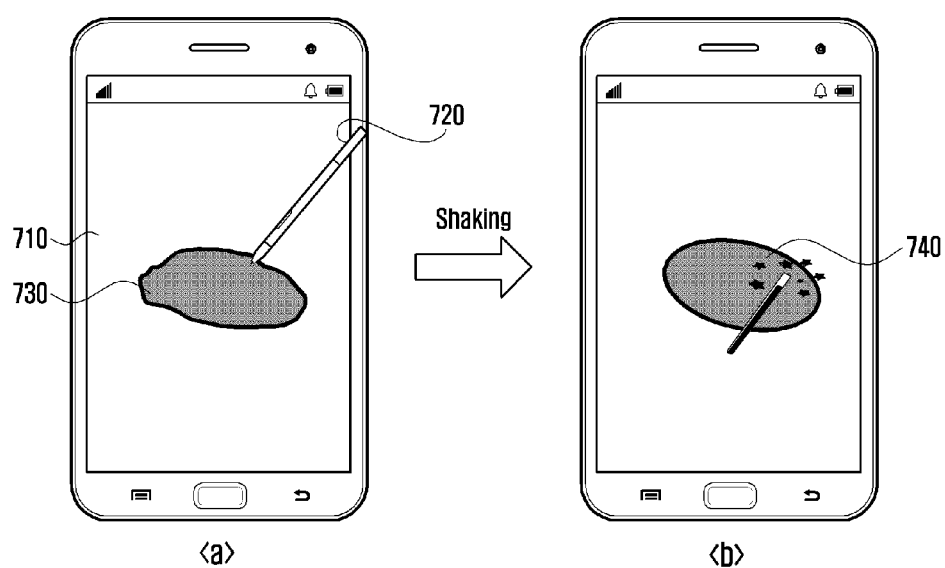
FIGS. 7A-7B are screen examples illustrating a method of processing multiple inputs according to another embodiment of the present invention.

FIG. 7 is a screen example illustrating a method of processing multiple inputs according to another embodiment of the present invention.

Referring to FIG. 7, the controller 170 detects the movement of the pen 720 from the memo writing screen 710. The controller 170 controls the line to be displayed according to the movement of the pen 720. If the displayed line is the closed curve 730, the controller 170 controls the color (e.g., blue) within the closed curve 730 to be displayed as illustrated in FIG. 7A. The controller 170 detects an input of the motion information from the sensor unit 160. For example, if the user shakes the apparatus 100, the sensor unit 160 generates corresponding motion information and transmits the generated information to the controller 170. The controller 170 calculates the speed using the detected motion information. Further, if the calculated speed exceeds an already stored threshold, it is determined that the detected motion information is a user input that requests the form of the closed curve to be changed to an ellipse. According to the determination, the controller 170 controls the closed curve 730 to be changed to an ellipse and displayed (see FIG. 7B). Further, the element for determining whether the detected motion information is a user input that requests a change of the form of the closed curve to an ellipse may include elements other than speed (e.g., moving direction, moving distance, etc.). Such elements may be set by the user in the environment setting.

Figure 8:
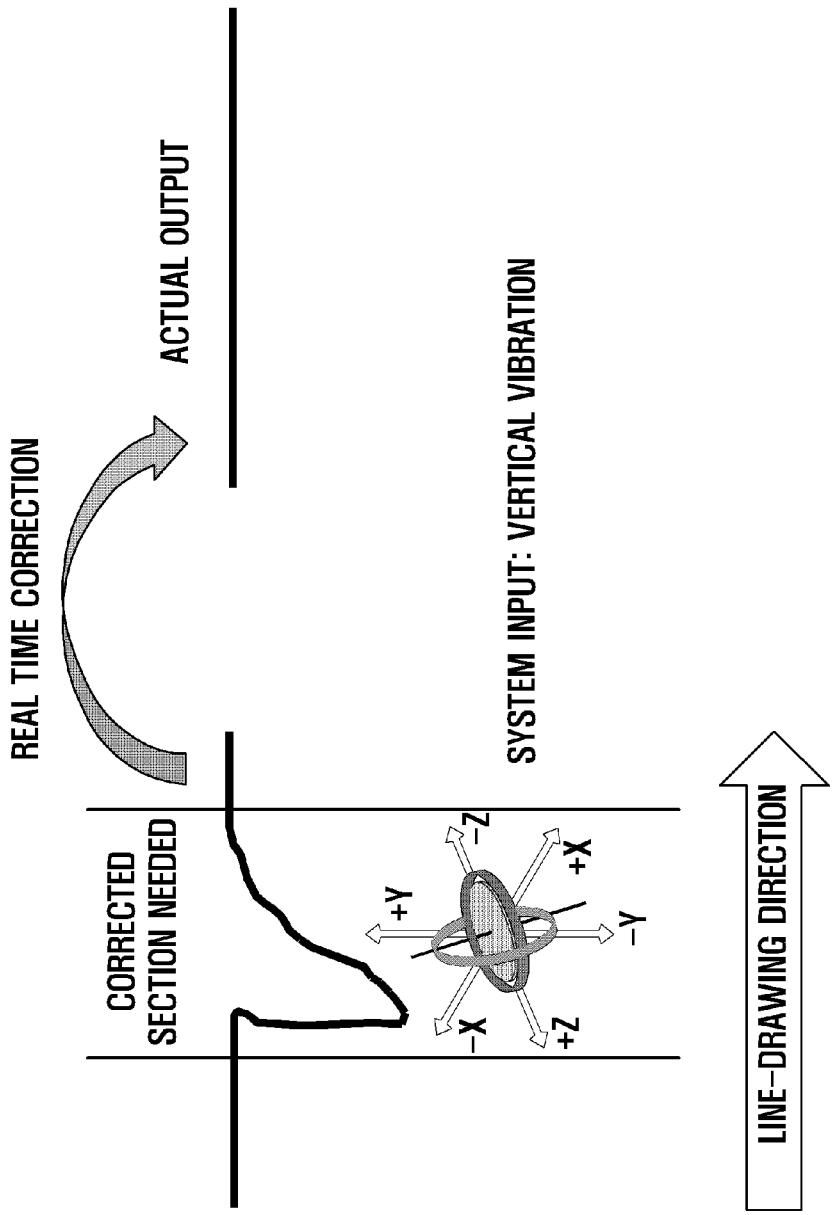
FIG. 8 is a screen example illustrating a method of processing multiple inputs according to another embodiment of the present invention.

FIG. 8 is a screen example for illustrating a method of processing multiple inputs according to another embodiment of the present invention. FIG. 8 assumes a situation in which a user draws a line on the touch screen 110.

Referring to FIG. 8, the controller 170 detects the movement of a handling means (e.g., a hand or a pen) from the touch screen 110. The controller 170 controls the line to be displayed according to the movement of the detected handling means. The controller 170 may detect the system input (e.g., a vertical vibration) from the sensor unit 160. The controller 170 calculates the speed from the system input, and if the calculated speed exceeds an already stored threshold, it is determined that the system input is a user's unintended input. According to the determination, the controller 170 determines the function performed for a time when the system input has been detected (e.g., line drawing) as a portion that requires correction, and corrects a portion that requires correction based on the function performed before and after the time when the system input was detected. For example, as illustrated in FIG. 8, the controller 170 corrects the line crooked by the vertical vibration of the apparatus 100 to be corrected to be straight and displays the line as illustrated in FIG. 8. Further, the element for determining whether the system input is a user's unintended input may include elements other than speed (e.g., moving direction, moving distance, etc.).

As described above, the present invention provides a method and apparatus for processing simultaneously input multiple inputs. Here, the multiple inputs may be user inputs input through different user interfaces. Further, the multiple inputs may include a user input and system input. Further, the present invention provides a method and apparatus for correcting a function that does not reflect the user's intention. Further, the present invention provides a method and apparatus for correcting a function performed according to the user's unintended system input.

As described above, according to the present invention, a user may be provided an environment in which two or more input methods may be combined and used. Further, according to the present invention, a user's intention may be recognized from voice information input from a microphone and the user's intention may be set to be accurately reflected on functions performed by another input.

The foregoing method of the present invention may be implemented in an executable program command form by various computer means and be recorded in a computer readable recording medium. In this case, the computer readable recording medium may include a program command, a data file, and a data structure individually or a combination thereof. In the meantime, the program command recorded in a recording medium may be specially designed or configured for the present invention or be known to a person having ordinary skill in a computer software field to be used. The computer readable recording medium includes Magnetic Media such as a hard disk, floppy disk, or magnetic tape, Optical Media such as a Compact Disc Read Only Memory (CD-ROM) or Digital Versatile Disc (DVD), Magneto-Optical Media such as a floptical disk, and a hardware device such as a ROM, RAM, and flash memory storing and executing program commands. Further, the program command includes a machine language code created by a compiler and a high-level language code executable by a computer using an interpreter. The foregoing hardware device may be configured to be operated as at least one software module to perform an operation of the present invention.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method of processing multiple inputs in an apparatus having interfaces, the method comprising:
   detecting a first input from one of the interfaces;
   performing a function in response to the first input, the function including a graphic work;
   detecting a second input from another one of the interfaces after performing the function; and
   changing attributes of the performed function in response to the second input.

2. The method of claim 1, wherein detecting the first input includes detecting a user's gesture from a touch screen that is one of the interfaces, and wherein detecting the second input includes detecting voice information from a microphone that is one of the interfaces.

3. The method of claim 1, wherein the graphic work is one of handwriting, drawing, painting and erasing.

4. The method of claim 3, wherein changing the attributes of the function includes:
- recognizing the user's intention by analyzing the voice information;
- determining whether correction is needed for an already performed graphic work;
- calculating a correction-required portion in the already performed graphic work if correction is needed; and
- reflecting the user's intention on the correction-required portion.

5. The method of claim 4, wherein determining whether the correction is needed includes determining that correction is needed in the already performed graphic work if the user's gesture and the voice information are simultaneously detected.

6. The method of claim 5, wherein calculating the correction-required portion includes including a portion performed for a time period for recognizing the user's intention from the already performed graphic work, in the correction-required portion.

7. The method of claim 1, wherein the first input is a first user input and the second input is one of a second user input and a system input.

8. The method of claim 7, wherein the first user input is one of a user's gesture, voice information input through a microphone, and motion information sensed in a sensor unit,
- wherein the second user input is another one of the user's gesture, the voice information input through the microphone, and the motion information sensed in the sensor unit, and
- wherein the system input is information related with an external environment of the apparatus.

9. An apparatus for processing multiple inputs, the apparatus comprising:
- interfaces; and
- a controller for controlling the interfaces,
- wherein the controller detects a first input from one of the interfaces, performs a function in response to the first input, detects a second input from another one of the interfaces after performing the function, and changes attributes of the performed function in response to the second input, and
- wherein the function includes a graphic work.

10. The apparatus of claim 9, wherein the interfaces include at least a touch screen and a microphone, and
- wherein the controller performs a function related with the graphic work in response to a user's gesture detected from the touch screen, and if voice information is detected from the microphone, the controller changes the attributes of the graphic work.

11. The apparatus of claim 10, wherein the touch screen includes a hand touch panel for sensing a hand gesture, a pen touch panel for sensing a pen gesture, and a display panel.

12. The apparatus of claim 11, wherein the graphic work is one of handwriting, drawing, painting and erasing by the pen gesture or the hand gesture.

13. The apparatus of claim 12, wherein the controller recognizes a user's intention by analyzing the voice information, determines whether correction is needed for an already performed graphic work, and if correction is needed, the controller calculates a correction-required portion from the graphic work and reflects the user's intention on the correction-required portion.

14. The apparatus of claim 13, wherein the controller determines that correction is needed for the already performed graphic work if the user's gesture and the voice information are simultaneously detected.

15. The apparatus of claim 14, wherein the correction-required portion includes a portion performed for a time period for recognizing the user's intention from the already performed graphic work, in the correct-required portion.

16. The apparatus of claim 12, wherein the first input is a first user input, and wherein the second input is one of a second user input and a system input.

17. The apparatus of claim 16, further comprising:
- a wireless communication unit connectable to a voice recognition server,
- wherein the controller controls the wireless communication unit to transmit a voice recognition request message including the voice information to the wireless communication unit, receives a response message including a result of processing a voice information from the voice recognition server through the wireless communication unit, determines whether correction is needed for an already performed graphic work, calculates a correction-required portion from the graphic work if the correction is needed, and reflects the result on the correction-required portion.

18. A non-transitory recording medium implemented in an apparatus having interfaces, the recording medium configured to perform a method comprising:
- detecting a first input from one of the interfaces;
- performing a function in response to the first input, the function including a graphic work;
- detecting a second input from another one of the interfaces after performing the function; and
- changing the attributes of the performed function in response to the second input.

19. The non-transitory recording medium of claim 18, wherein the first input is a first user input and the second input is a second user input.

20. The non-transitory recording medium of claim 18, wherein the first input is a first user input and the second input is a system input.

* * * * *